(12) United States Patent
Kim

(10) Patent No.: US 12,007,006 B1
(45) Date of Patent: Jun. 11, 2024

(54) ROTARY MACHINE AND POWER SYSTEM COMPRISING THE ROTARY MACHINE

(71) Applicant: Hoe Jong Kim, River Edge, NJ (US)

(72) Inventor: Hoe Jong Kim, River Edge, NJ (US)

( * ) Notice: Subject to any disclaimer, the term of this patent is extended or adjusted under 35 U.S.C. 154(b) by 0 days.

(21) Appl. No.: 18/131,843

(22) Filed: Apr. 6, 2023

(51) Int. Cl.
| F16H 37/04 | (2006.01) |
| F03D 7/02 | (2006.01) |
| F03D 15/00 | (2016.01) |
| H02K 7/116 | (2006.01) |
| H02K 7/18 | (2006.01) |

(52) U.S. Cl.
CPC ......... F16H 37/041 (2013.01); F03D 7/0204 (2013.01); F03D 15/00 (2016.05); H02K 7/116 (2013.01); H02K 7/1838 (2013.01); F05B 2260/4031 (2013.01); F05B 2270/32 (2013.01); F05B 2270/321 (2013.01)

(58) Field of Classification Search
CPC ...... F03D 7/0204; F03D 15/00; F16H 37/041; H02K 7/116; H02K 7/1838; F05B 2260/4031; F05B 2270/32; F05B 2270/321
See application file for complete search history.

(56) References Cited

U.S. PATENT DOCUMENTS

| 4,741,672 A * | 5/1988 | Breuner | B64C 27/02 |
| | | | 416/167 |
| 5,253,979 A * | 10/1993 | Fradenburgh | B64C 27/46 |
| | | | 416/223 R |
| 7,581,926 B1 * | 9/2009 | Dehlsen | F03D 7/0236 |
| | | | 416/37 |
| 8,540,485 B2 * | 9/2013 | Bogrash | F03D 5/04 |
| | | | 416/17 |
| 11,801,747 B1 * | 10/2023 | Goldman | B60K 17/145 |
| 2003/0223868 A1 * | 12/2003 | Dawson | F03D 7/0236 |
| | | | 416/1 |
| 2007/0286728 A1 * | 12/2007 | Hotto | F03D 1/0675 |
| | | | 416/1 |
| 2009/0226314 A1 * | 9/2009 | Bogrash | B64C 39/005 |
| | | | 416/111 |

* cited by examiner

*Primary Examiner* — Tulsidas C Patel
*Assistant Examiner* — Thomas K Quigley
(74) *Attorney, Agent, or Firm* — Park & Associates IP Law Office

(57) ABSTRACT

A rotary machine for a power system includes a rotary drum having a rotational center shaft, a stationary half gear including a generally circular non-geared portion and a geared portion having gear teeth, and at least one pair of revolving gears formed of two revolving gears symmetrically positioned about the center shaft and configured to simultaneously revolve around the stationary half gear. At least one rack shaft is operably coupled, directly or indirectly, to the revolving gears to reciprocate back and forth upon rotation of the revolving gears, and as the revolving gears revolve around the stationary half gear, one of the two revolving gears is configured to have gear engagement with the geared portion of the stationary half gear, while the other revolving gear is floating over the non-geared portion of the stationary half gear.

15 Claims, 19 Drawing Sheets

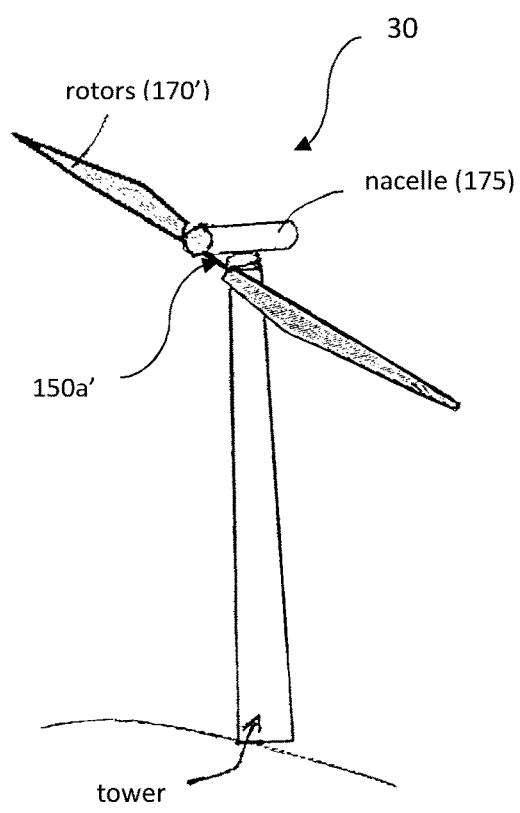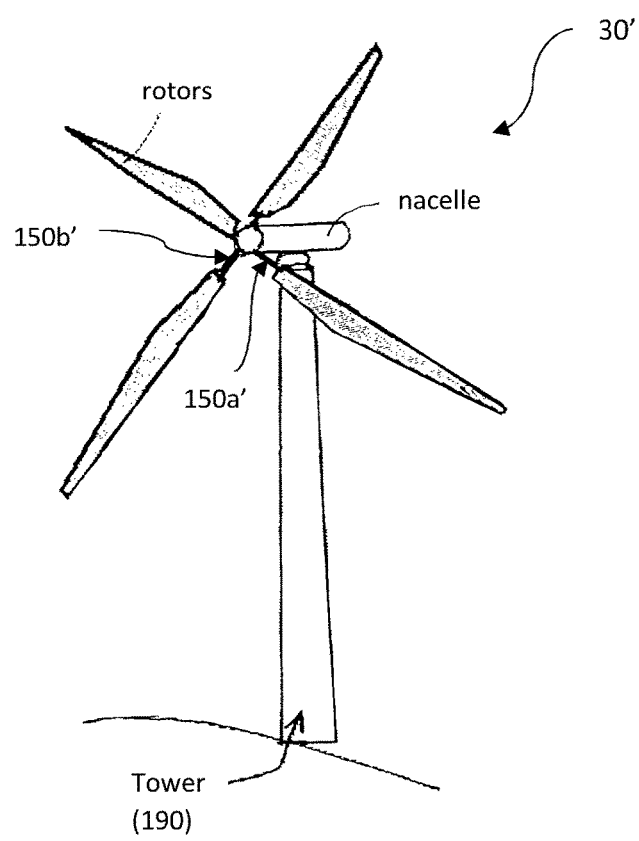
FIG. 15A  FIG. 15B

ROTARY MACHINE AND POWER SYSTEM COMPRISING THE ROTARY MACHINE

FIELD OF THE INVENTION

The present invention relates to a rotary machine and components thereof, and a power system utilizing the rotary machine, such as wind turbines and/or energy systems to generate power typically utilizing environmental energy sources such as wind and streaming/falling water.

BACKGROUND OF THE INVENTION

An engine or motor is a device to convert one form of energy into mechanical energy. For example, electric motors convert electrical energy into mechanical motion, and internal combustion engines use hydraulic expansion energy of burning fuel in a combustion chamber to extract mechanical energy to drive a machine such as an automobile. For another example, wind turbines, windmills and waterwheels utilize the energy of wind and falling water, and convert such environmental energy into a rotational motion of rotating arms of a wheel in order to generate electricity using the converted mechanical energy from the rotating arms.

Typically, the rotors or rotating arms of such rotary motion devices have constant lengths (i.e., arm radius) to provide continuous rotational motions in the apparatus, and such rotary motion devices uses low-frictional elements, such as bearings, adopted in the rotational components of the apparatus. However, there exists continuing needs to improve power efficiencies, structures and functions of such rotational apparatus.

SUMMARY OF THE INVENTION

The present invention has been made to provide a useful rotary machine and components thereof, and also a power system utilizing the rotary machine to generate power by typically using an environmental energy source such as wind and flowing water.

In accordance with one aspect of the present invention, a rotary machine comprises: a rotary drum having a center shaft configured to be rotated; a stationary half gear including a non-geared portion of generally a circular contour and a geared portion having gear teeth, an outer diameter of the gear teeth raised from the non-geared portion; at least one pair of revolving gears, each pair composed of two revolving gears symmetrically positioned about the center shaft of the rotary drum and configured to simultaneously revolve around the stationary half gear; and at least one rack shaft operably coupled, directly or indirectly, with the revolving gears to reciprocate back and forth upon rotation of the revolving gears, and wherein as the revolving gears revolve around the stationary half gear, one of the two revolving gears is configured to have gear engagement with the geared portion of the stationary half gear, while the other revolving gear is configured to be idle to float over the non-geared portion of the stationary half gear.

The rotary drum preferably includes a body portion and at least one pair of gear positioning arms extended radially outwardly from the body portion, wherein the revolving gears are fixed to the gear positioning arms, respectively.

The rotary machine preferably further comprises at least one pair of pinions coaxially coupled with the at least one pair of gear positioning arms, respectively, and wherein the at least one rack shaft includes linearly arranged gear teeth and are operably coupled with the pinions.

The rotary machine preferably further comprises at least one roller fixing plate, the roller fixing plates including a plurality of rollers coupled thereto for guiding reciprocal movements of the rack shafts.

In accordance with one aspect of the present invention, a power system comprises:
a rotary machine, wherein the rotary machine comprises:
a rotary drum having a center shaft configured to be rotated; a stationary half gear including a non-geared portion of generally a circular contour and a geared portion having gear teeth, an outer diameter of the gear teeth raised from the non-geared portion; at least one pair of revolving gears, each pair composed of two revolving gears symmetrically positioned about the center shaft of the rotary drum and configured to simultaneously revolve around the stationary half gear; and at least one rack shaft operably coupled, directly or indirectly, with the revolving gears to reciprocate back and forth upon rotation of the revolving gears; wherein as the revolving gears revolve around the stationary half gear, one of the two revolving gears is configured to have gear engagement with the geared portion of the stationary half gear, while the other revolving gear is configured to be idle to float over the non-geared portion of the stationary half gear; and
wherein the power system further comprises at least two blades, each blade coupled to each terminal end portion of the rack shafts.

The power system preferably further comprises a yaw drive configured to control the orientation of the power system, a gear box couples to the center shaft of the rotary machine, and a generator to convert the wind energy from the center shaft of the rotary machine to electrical energy. The power system preferably further comprises an anemometer to measure the wind speed, and a. wind vane to measure the wind direction.

BRIEF DESCRIPTION OF THE DRAWINGS

The above and other objects, features and other advantages of the present invention will be more clearly understood from the following detailed description taken in conjunction with the accompanying drawings, in which:

FIG. 11B is a view illustrating the detailed structures of the lower left end side, that is, the second end portion (i.e., the opposite side from the first end portion) of the first rack shaft 150a;

FIG. 12A is a view illustrating detailed structures of the first end portion of the first rack shaft 150a;

FIG. 15A is a schematic drawing of the power system having one rotor shaft (i.e., one rack shaft 150a') according to another embodiment of the present invention, utilizing the rotary machine of the invention as a main component of the power system;

FIG. 15B is a schematic drawing of the power system having two rotor shafts (i.e., two rack shafts 150a' and 150b') according to another embodiment of the present invention, utilizing the rotary machine of the invention as a main component of the power system.

DETAILED DESCRIPTION OF THE INVENTION

Figure 1:
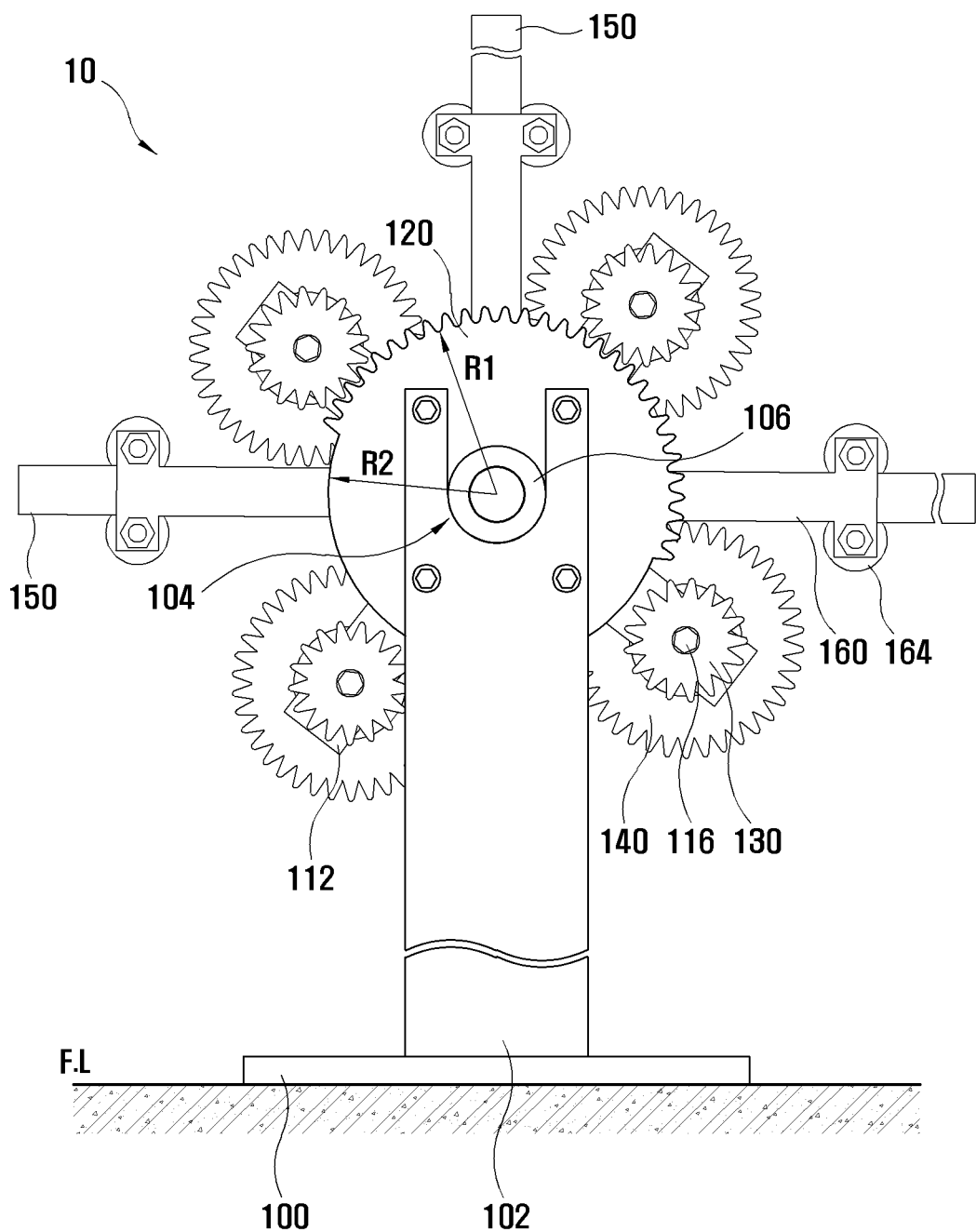
FIG. 1 is a front elevational view of the rotary machine according to one embodiment of the present invention, illustrating basic structures and main components of the rotary machine of the invention.

Hereinafter, exemplary embodiments of the rotary motion apparatus and the power system according to the present invention will be described in detail with reference to the accompanying drawings.

However, the present invention may be modified in various forms, and therefore the present invention is not limited to the embodiments disclosed herein. The embodiments of the present invention are presented to enable a person of ordinary skill in the art to understand, make or practice the present invention. The shapes of elements shown in the drawings are illustrated to describe the principles, basic structures, and general operation and functions of the present invention.

Referring to the drawings, basic structures, general concepts, and operations of the rotary machine and the power system of the present invention are described herein. The disclosure may be achieved in various different forms without being limited to the embodiments set forth herein. For clarity of description, like numerals refer to like elements throughout this disclosure. It is further noted that at least some of the drawings are shown in photographic representation and schematic illustrations, and they may include exaggerated views that are not shown in scale.

It is particularly noted that the exemplary embodiments of the rotary machine and the power system utilizing the rotary machine of the present invention illustrated in this disclosure are provided mostly in the form having two (2) rotors (i.e., two rack shafts) spaced equally apart from each other, and crossing each other to provide a cross shape as whole. However, the present invention is not limited thereto, and the rotary machine can have different configurations. For example, as will be described in detail below, the rotary machine and the power system of the invention can have three (3) or more rotors (rack shafts) spaced equally apart from one another, and also, they can have one (1) rotor (namely, one rack shaft) which is rotating while also reciprocating in and out.

Figure 2:
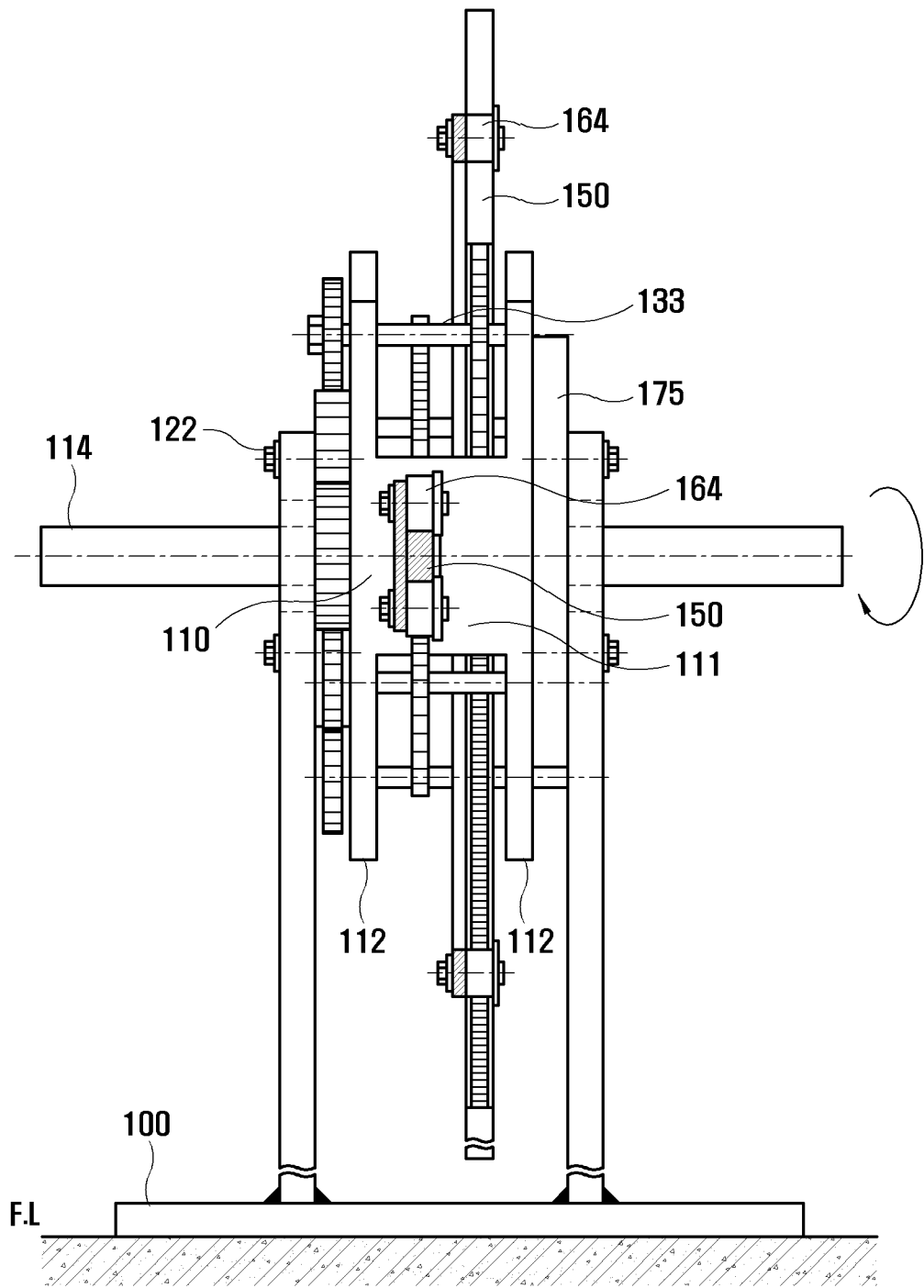
FIG. 2 is a side elevational view of the rotary machine of FIG. 1.

Referring first to FIGS. 1 and 2, basic structures of the rotary machine having two (2) rotors (i.e., two rack shafts) are described. The rotary machine 10 of the present embodiment includes a base 100 securely fixed to the ground (as shown) or a base structural member, and one or a pair of post bodies 102 secured to the base 100 to form the base structure of the machine. The post bodies 102 are preferably in the form of a pair of vertical elongate plate as shown, and each post body 102 includes a U-shaped vertical groove 104 with a semi-circular hole portion at the bottom of the groove as shown. However, a circular hole (not shown) can alternatively be formed at the location of the semi-circular hole portion in lieu of the vertical groove 104.

A low-fractional bearing 106 (e.g., a precision ball bearing or roller bearing) is affixed to the semi-circular hole portion of each vertical groove 104 of the pair of post bodies 102. To the inner race of the bearings 106, coaxially aligned center shafts of the rotary drum (to be described below) are to be coupled.

The rotary machine 10 further includes a rotary drum 110 (see FIGS. 2 and 3) which has the shape of a cylinder with arms or wings radially extended from the cylinder. More specifically, the rotary drum 110 includes a central drum portion 111 and two sets of four (thus, a total of eight) gear positioning arms 112 extending radially from the central drum portion 111, the first four gear positioning arms 112 at the front/left side of the drum (as shown from FIG. 2) and the second four gear positioning arms 112 at the rear/right side of the drum on the symmetrical locations to the first set of the arms. In this manner, the four gear positioning arms 112 of each set are arranged 90 degrees apart to one another and arranged at the same circumferential locations and having the same shapes.

The rotary drum 110 includes coaxially aligned center shafts 114 at two opposite sides, and the center shafts 114 are coupled to the inner race of the precision bearings 106 to have a friction-free rotation of the rotary drum 110 on the bearings attached to the post bodies 102.

A stationary half gear 120 is affixed to the first one (the left one in FIG. 2) of the post bodies 102 with fasteners, such as four bolts 122, at location between the first post body 102 and the rotary drum 110 as shown in FIGS. 1 and 2.

The stationary half gear 120 has generally a circular shape and includes a non-geared portion having a circular outer surface formed on approximately one half (about 180 degree) of the circle and a geared portion having gear teeth formed approximately on the other half (about 180 degree) of the circle in such manner that the non-geared portion is slightly raised from the outer surface of the circular non-geared portion of the half gear. As such, the stationary half gear 120 is specifically designed to have the root radius R1 of the geared portion as same as or slightly greater than the radius R2 of the non-geared portion of the gear.

As shown in FIGS. 1 and 2, the rotary machine 10 further includes a plurality of (e.g., four) revolving gears 130, each being positioned to a radially equidistant location at the front (left in FIG. 2) side of the gear positioning arms 112 in a manner such that the revolving gears 130 are to be engaged with the gear teeth in the geared portion of the stationary half gear 120 when the corresponding gear positioning arm 112 of the rotary drum 110 is rotated into the geared portion of the stationary half gear 120. Here, the diameter and the number of teeth of the revolving gears 130 are chosen to be considerably smaller than that of the stationary half gear 120. For coupling the revolving gears 130, the gear positioning arms 112 of the rotary drum 110 include gear shaft coupling holes 117 (see FIG. 3).

Figure 12:
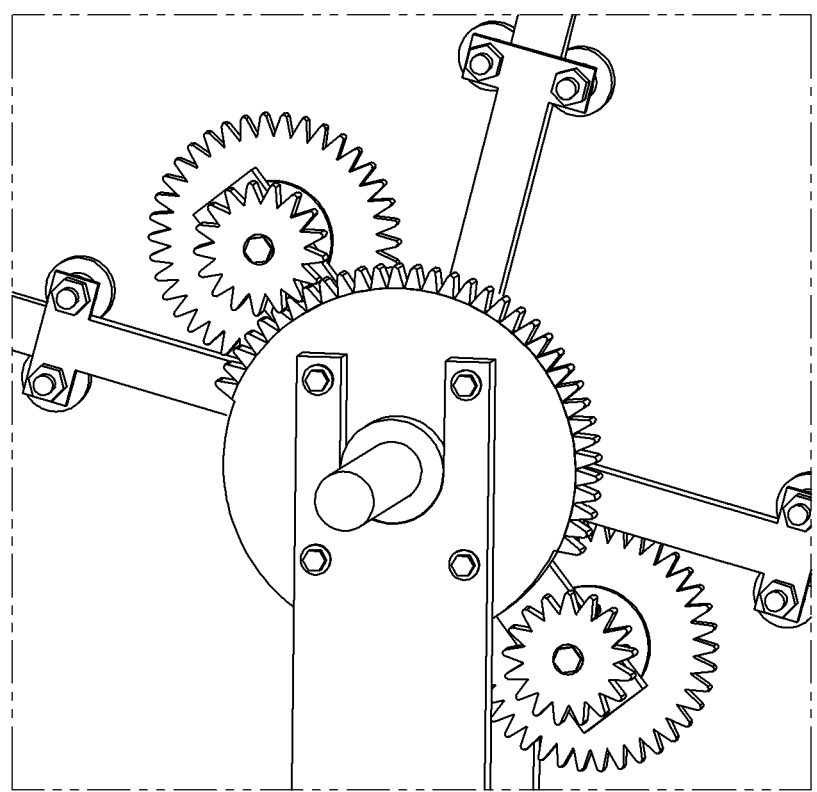
FIG. 12 is a view of an embodiment of the rotary machine for illustrating an operating state of the machine subsequent to the state shown in FIG. 11, in which the first end portion (the lower right end portion) of the first rack shaft 150a has left the maximally extended position (P3) and now in floating (idle) state, where the second end portion (the upper left end portion) of the first rack shaft 150a has passed the position P1, and thus, the second end portion is started extending from the least extended state (P1)
Figure 12A:
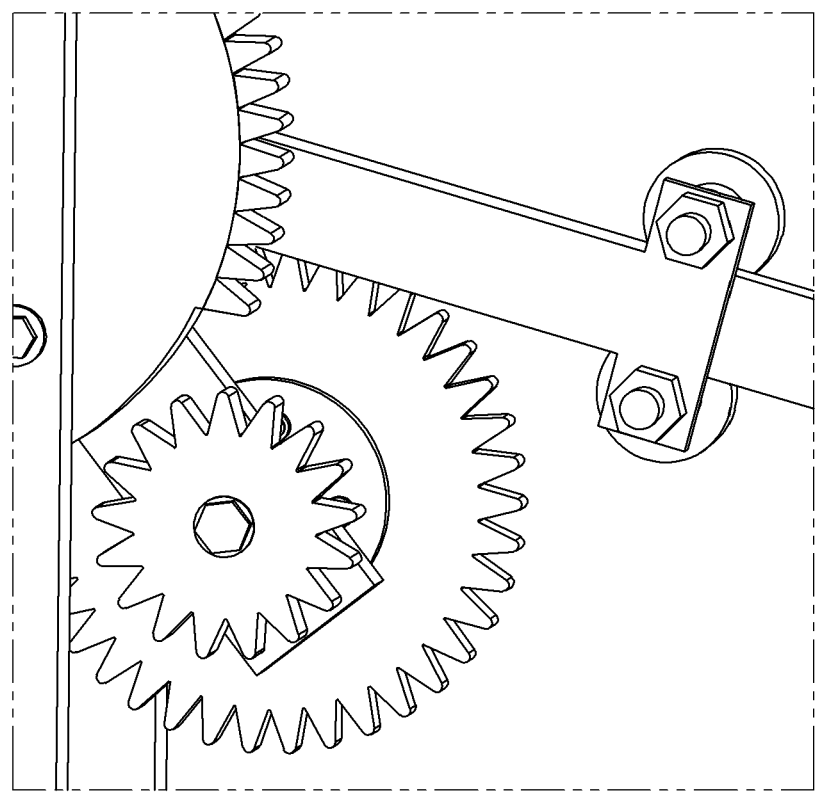
Figure 13:
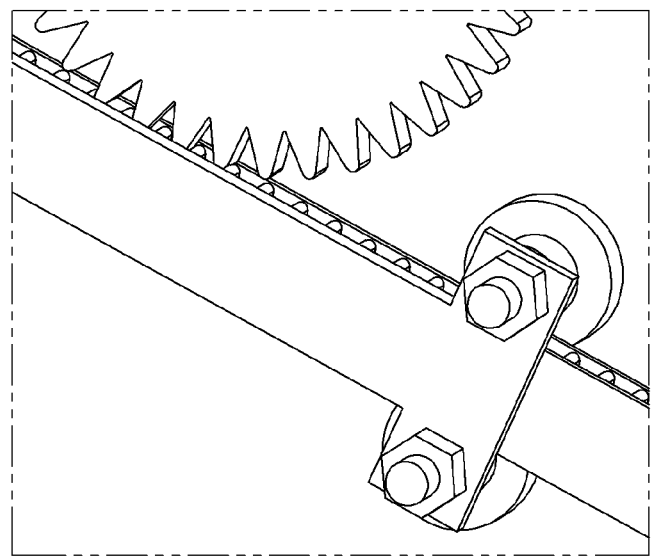
FIG. 13 is a view illustrating the gear engagement structure of the rack shaft and the pinion of the rotary machine.

However, it is noted that the revolving gears are not to be contacted with, and thus, floating over the outer surface of the non-geared portion of the half gear 120 when they are further revolved and moved to the non-geared portion of the half gear (see FIGS. 1 and 12A). This is also the reason why the stationary half gear 120 is specifically designed to have the root radius R1 of the geared portion greater than the radius R2 of the non-geared portion of the gear as explained above.

Therefore, the rotary machine of the invention is designed such that, among the four revolving gears 130, two revolving gears are always in gear engagement with the gear teeth of the stationary half gear 120. For example, as shown in FIG. 1, among the four revolving gears 130, only the first revolving gear (the upper left one in FIG. 1) and the second revolving gear (the upper right one in FIG. 1) are in gear engagement with the gear teeth of the stationary half gear 120, while the remaining two revolving gears are floating over in the non-geared portion of the stationary half gear 120.

A plurality of (i.e., four) pinions 140 are attached to the center shafts 133 of revolving gears 130 at locations between the front (left) gear positioning arms 112 and the rear (right) gear positioning arms 112. Thus, the pinions 140 are attached at locations coaxial to their corresponding revolving gears 130, respectively. By this configuration, each of the pinions 140 are to be revolved to circle around the stationary half gear 120 together with its corresponding revolving gear 130 and its corresponding gear positioning arm 112. Here, the diameter and the number of teeth of the pinions 140 are chosen to be greater than that of the revolving gears 130.

Figure 3:
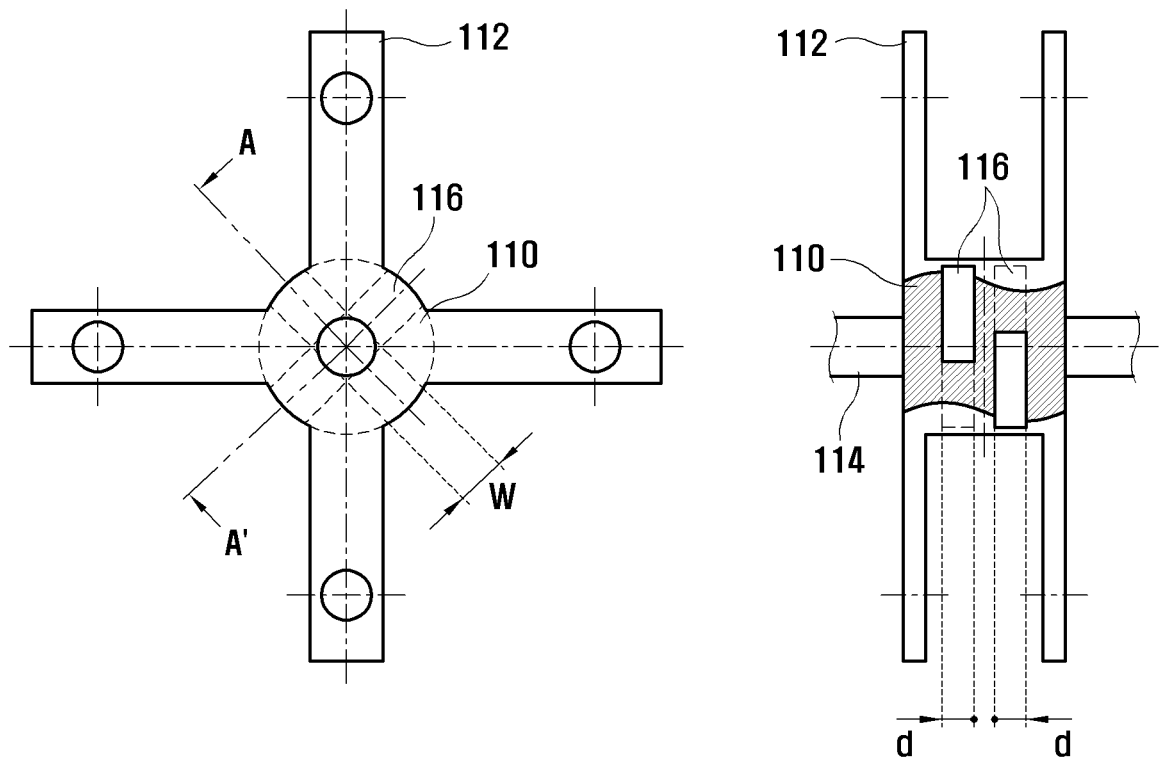
FIG. 3 shows an elevational view and a sectional view illustrating the rotary drum according to the embodiment of FIG. 1 of the rotary machine.

Referring to FIG. 3, the central drum portion 111 of the rotary drum 110 includes two through holes (namely, two rack shaft guide slots 116) of rectangular shape, which are formed in radial directions to pass through the rotation center of the central drum portion 111 at two locations exactly between the perpendicularly-extending gear positioning arms 112 of the rotary drum 110, as shown in FIG. 3, such that each rack shaft guide slot 116 is forty five (45) degrees apart from its adjacent gear positioning arms 112. Each rack shaft guide slot 116 has a width ("w") and a depth ("d") as shown in the drawings.

Figure 4:
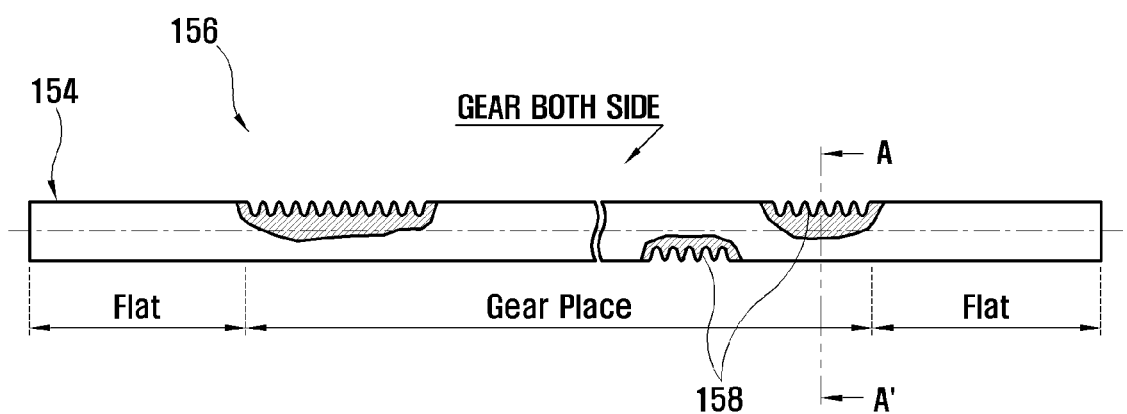
FIG. 4 is a front elevational view illustrating the reciprocating rack shaft member according to the embodiment of FIG. 1.
Figure 4A:
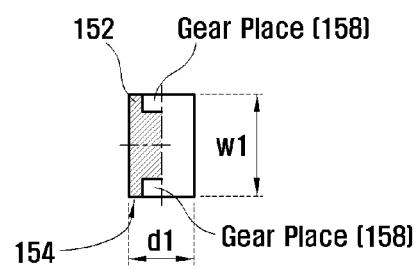
FIG. 4A is a sectional view illustrating the reciprocating rack shaft member of FIG. 4.

Referring now to FIGS. 1, 4 and 4A, the rotary machine 10 further includes a pair of rack shafts 160 having an extended rectangular bar shape. Each rack shaft 150 include two opposing side rims 152 with their upper and lower surfaces each defining a linear and smooth sliding surface 154 throughout the length of the rack shaft 150. The side rims of each rack shaft 150 define a width ("w1") and a thickness or depth ("d1") as shown in the drawings. The width 'w1' of the rack shaft is about as same as or slightly smaller than the width 'w' of the rack shaft guide slot 116 for allowing sliding movements therein. The rack shafts 150 are introduced to its corresponding rack shaft guide slot 116 of the rotary drum 110 and positioned at one side of the guide slot 116 of the rotary drum 110 in slidable manner therein.

A rack portion 156 is provided at the interior region of the rack shafts 150 between the side rims 152, and the rack portion 156 includes a set of linearly extending gear teeth 158 having the same pitch with the pitch of the pinion 140 so that the rack shaft can be moved linearly upon rotation of its corresponding pinion 140 engaged to the rack shafts as shown in FIG. 1.

Figure 5:
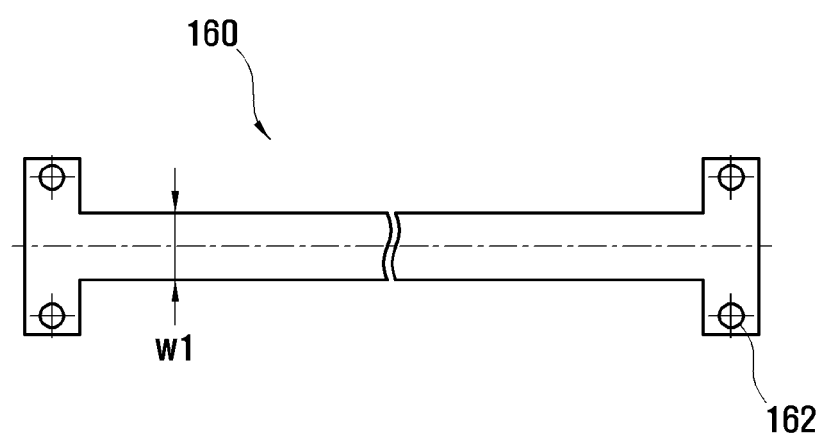
FIG. 5 is a front elevational view illustrating the roller fixing plate according to the embodiment of FIGS. 1 and 2.

Referring now to FIGS. 1 and 5, the rotary machine 10 further includes a pair of roller fixing plates 160 having an elongated rectangular bar shape with enlarged terminal portions, resembling a "capital I character" like shape as a whole. The terminal portions of each roller fixing plate 160 include four roller fixing holes 162, to which four rollers 164 are fixed. The main body portion of each roller fixing plate 160 is introduced into its corresponding rack shaft guide slot 116 of the rotary drum 110 and positioned at one side of the guide slot 116. The main body portion of each roller fixing plate 160 has a width ("w1") which is the same as that of the rack shaft 150 and a thickness or depth (d2, not shown in FIG. 5). The sum of thickness 'd1' of the rack shaft 150 and thickness 'd2' of the roller fixing plate 160 is about as same as or slightly smaller than the depth cd' of the rack shaft guide slot 116 of the rotary drum 110. With this configuration, the rack shafts 150 can be freely reciprocated within the rack guide slots 116 of the rotary drum 110, while is also rotating as the rotary drum rotates. At the same time, the revolving gears 130 and the pinions 140 simultaneously revolve about the stationary half gear 120.

It is noted that the roller fixing plates 160 are preferably affixed to the inner wall of the rack guide slots 116 of the rotary drum 110 to have the two parts rotating together but not allowing a sliding motion between them. Thus, the rack shafts 150 can be reciprocated inside the rack guide slots 116 while guide by the rollers 164 of the roller fixing plates 160.

Figure 6:
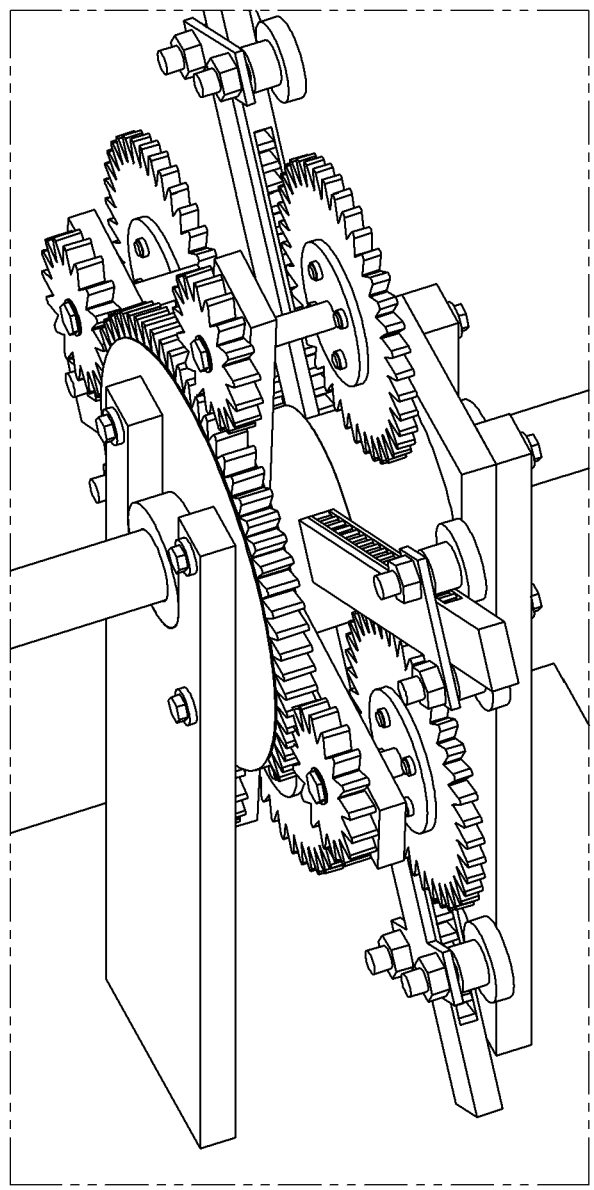
FIG. 6 is a view of an embodiment of the rotary machine for illustrating a portion of the rotary machine in detail.

FIG. 6 shows a view for illustrating a portion of the rotary machine (e.g., revolving gears 130 and pinions 140, stationary half gear 120, rotary drum 110, rack shafts 150, and roller fixing plates 160) in detail which is in the form of an example. This picture is provided for allowing better understanding of the present invention.

Figure 7:
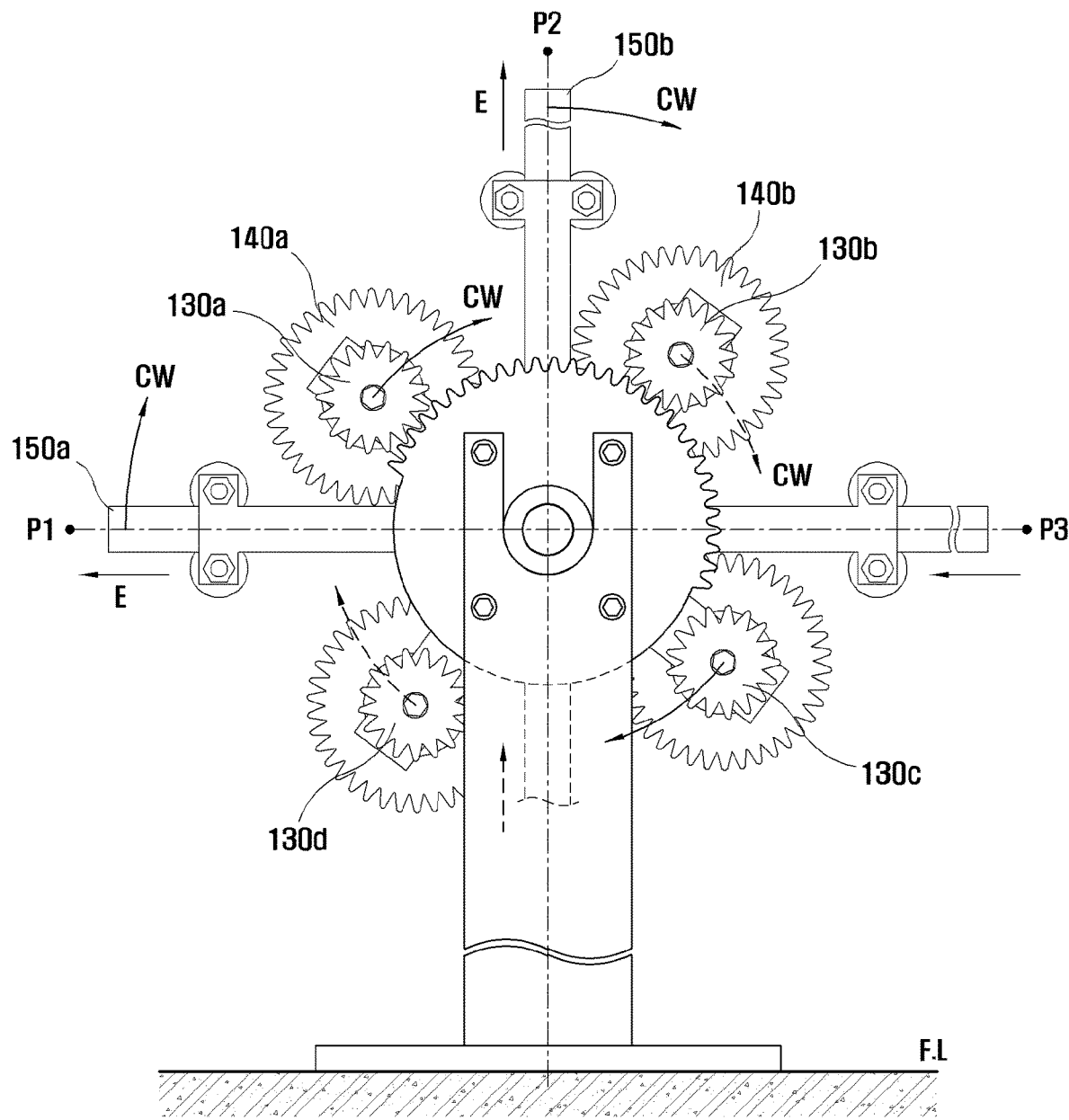
FIG. 7 is a front elevational view similar to FIG. 1 for further illustrating general concepts and basic operations of the rotary machine.
Figure 8:
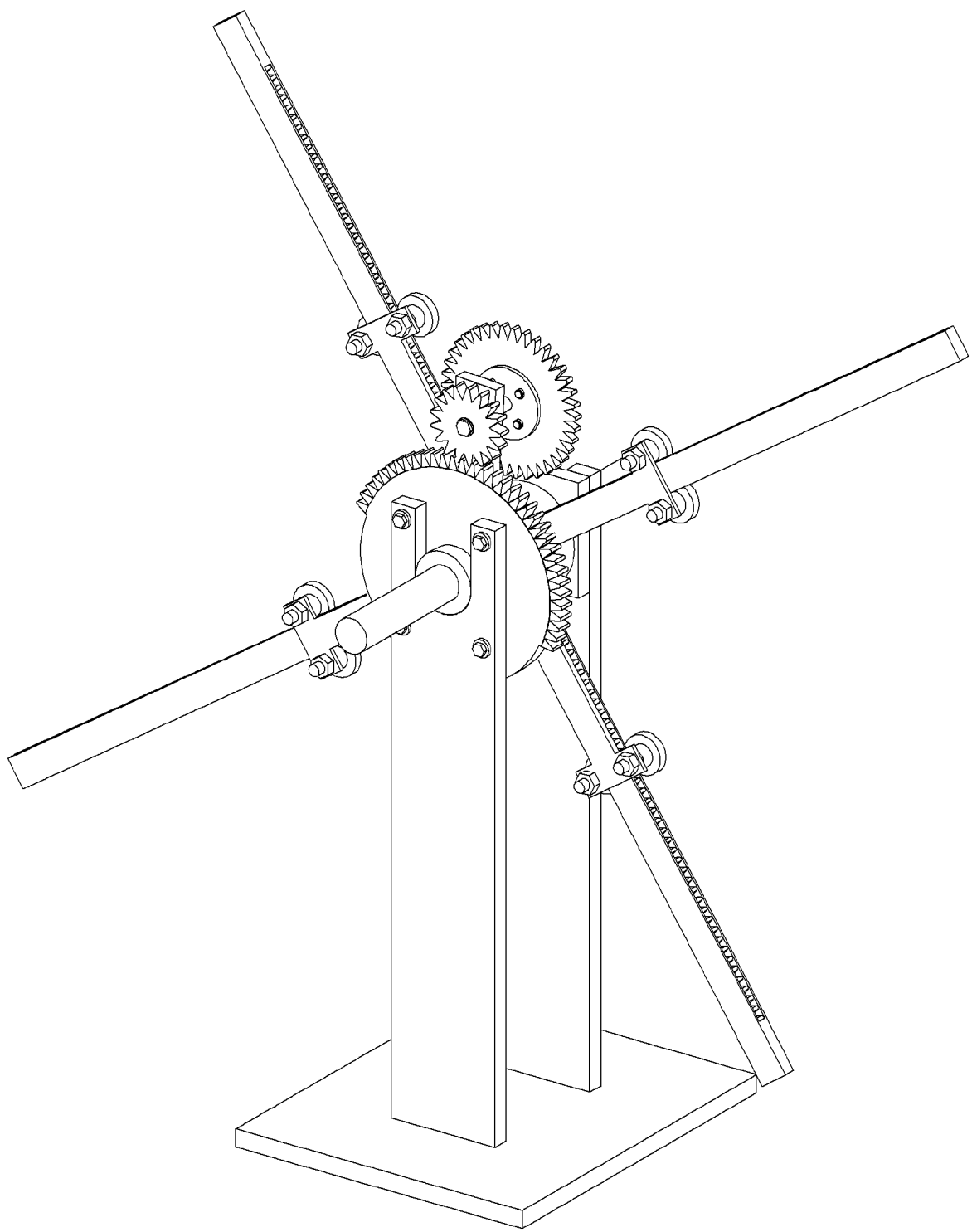
FIG. 8 is view of an embodiment of the rotary machine for illustrating a general construction and structure of the rotary machine, in which some components, such as revolving gears and pinions for the second rack shaft (150b), are not assembled to the rotary machine illustrating only one set of the first revolving gear and pinion for simplicity purposes.

Referring to FIG. 7, basic operations of the rotary machine of the present invention is described herein. As described above (see FIG. 3), the rotary drum 110 of the rotary machine includes two rack shaft guide slots 116 formed in radial directions to pass through the rotation center of the central drum portion 111 of the rotary drum 110 at two locations exactly between the perpendicularly extending gear positioning arms 112 of the rotary drum 110, such that each rack shaft guide slot 116 is forty five (45) degrees apart from its adjacent gear positioning arms 112.

Therefore, a rotation of the rack shafts 150 in the clockwise direction 'CW' (as indicated in FIG. 7) results in a simultaneous rotation of the central drum portion 111 and the gear positioning arms 112 of the rotary drum 110, which in turn causes a simultaneous revolution and rotation of the revolving gears 130 also in the clockwise direction 'CW' while engaged with the gear teeth of the stationary half gear 120. Here, the rotation can optionally be powered, for example, by wind energy to be described later in detail in connection with another embodiment of the present invention.

Describing more specifically, FIG. 7 depicts a state where the first revolving gear 130a (which moves clockwise as its corresponding rack shaft 150a rotates) has just started its gear engagement with the left end part (starting part) of the geared portion of the stationary half gear 120. This makes the first pinion 140a to revolve simultaneously in the clockwise direction 'CW' while also rotating clockwise.

Since the four gear positioning arms 112 are rotated simultaneously as one unit with the rotary drum 110, the movement of the first revolving gear 130a and first pinion 140a automatically leads to:
 (1) the second revolving gear 130b (and the second pinion 140b) to progress its gear engagement with the stationary half gear 120 and move clockwise to a position just passed the middle point of the geared portion of the stationary half gear 120;
 (2) the third revolving gear 130c (and the third pinion 140c) to progress to move clockwise to a position just leaving the gear engagement with the right end part (ending part) of the geared portion of the stationary half gear 120, thus, in "idle" state; and
 (3) the fourth revolving gear 130d (and the fourth pinion 140d) to progress to move clockwise to a position just passing the middle point of the non-geared portion of the stationary half gear 120 while floating over the stationary half gear 120, thus, in "idle" state.

As such, FIG. 7 shows an operating state where the first revolving gear 130a and the second revolving gear 130b are in gear engagement position with the stationary haft gear 120, and the third revolving gear 130c and the fourth revolving gear 130d are in idling position (or "off" position) without gear engagement with the stationary haft gear 120.

Upon further operation, the fourth revolving gear 130d and the third revolving gear 130c revolves further and are moved to the places of the second revolving gear 130b and the first revolving gear 130a, respectively, as the rotating units are rotated 180 degrees from the previous state as shown in FIG. 7.

As such, in the rotary machine 10 having two rotor shafts (i.e., two rack shafts 150), the stationary half gear 120 and the revolving gears 130 are specifically designed to have two revolving gears always in gear engagement position with the stationary half gear 120, while the remaining two revolving gears in idle positions. Based on these design concepts of the present invention, specific technical considerations are to be made in choosing the size and suitable number of gear teeth for the stationary half gear 120 and the revolving gears 130.

As described above, each of the four pinions 140 are coaxially positioned with their corresponding revolving gear 130 by common center shafts 133 (see FIG. 2) as discussed above. However, only two pinions corresponding to the two active revolving gears (e.g., the first revolving gear 130a and the second revolving gear 130b in the state of FIG. 7) engaged with the stationary half gear 120 are to be actively rotated, and this causes the two rack shafts 150 to reciprocate in and out from the rack shaft guide slots 116 of the rotary drum 110 while the reciprocating sliding movement being guided by the rollers 164 of the roller fixing plates 150.

Figure 9:
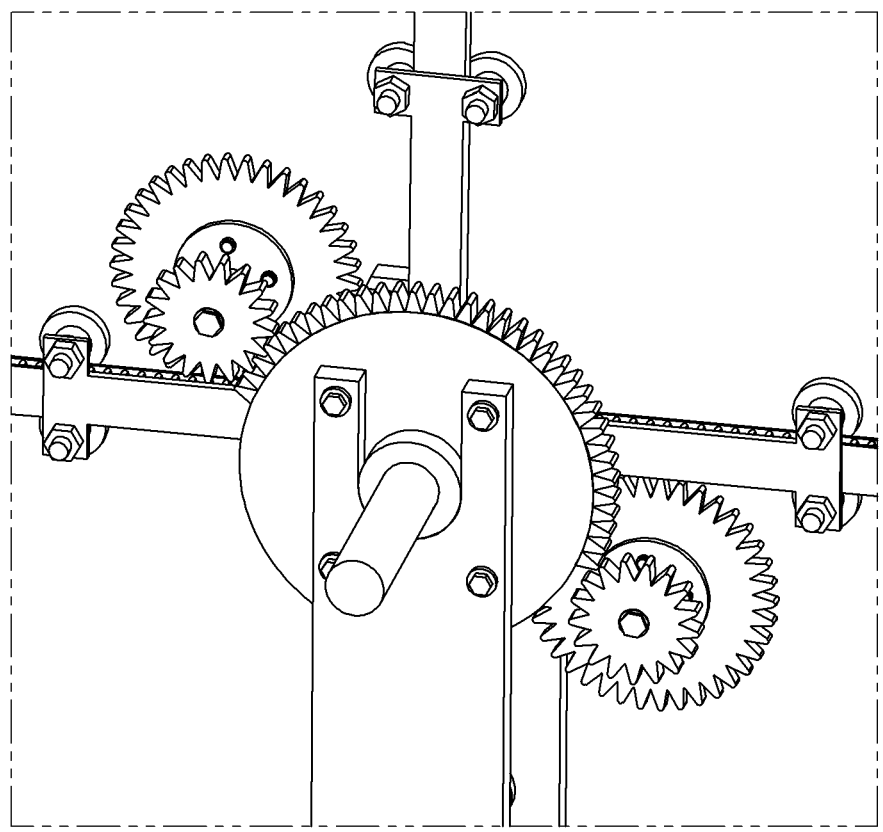
FIG. 9 is a view of an embodiment of the rotary machine for illustrating basic operation of the rotary machine, which depicts an operating state of the machine in which a first end portion (the left end portion) of the first rack shaft 150a is at the least extended (the shortest) position (P1) which is the position also shown in FIG. 7.

In the particular state shown in FIG. 7, the first revolving gear 130a is located on a starting point of the geared portion of the stationary half gear 120, where the first end portion (i.e., the left end portion in FIG. 7) of the first rack shaft 150a is at the least extended position ("P1") from the center of the stationary half gear 120. Please also refer to FIG. 9 which is a view of the machine for illustrating this state, in which only the first revolving gear 130a and the third revolving gear 130c are seen for simplicity purposes.

Figure 10:
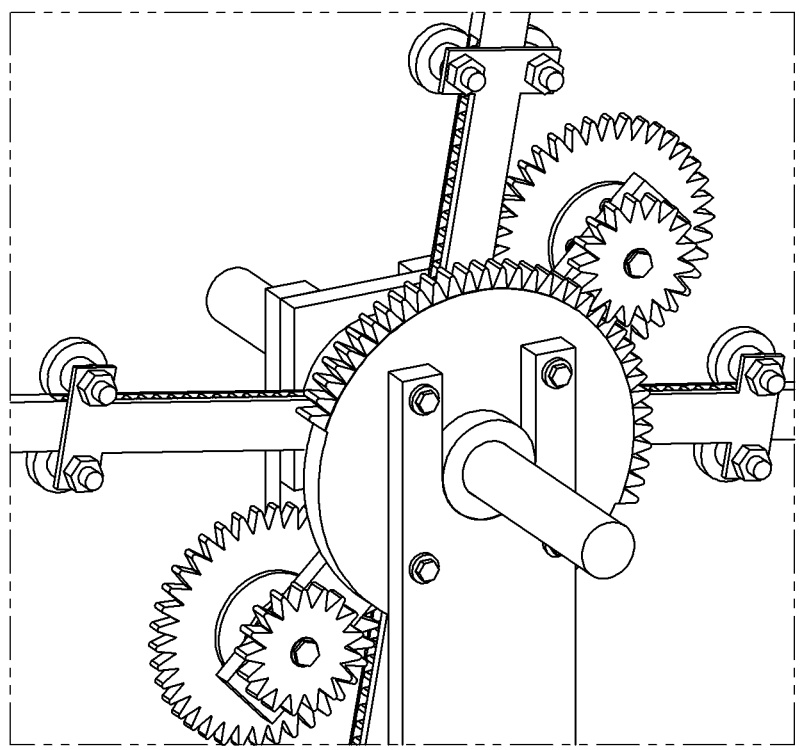
FIG. 10 is a view of an embodiment of the rotary machine for illustrating basic operation of the rotary machine, which depicts an operating state of the machine subsequent to the state shown in FIG. 9, in which the first end portion (now the upper end portion) of the first rack shaft 150a is an intermediately extended position (P2)
Figure 10A:
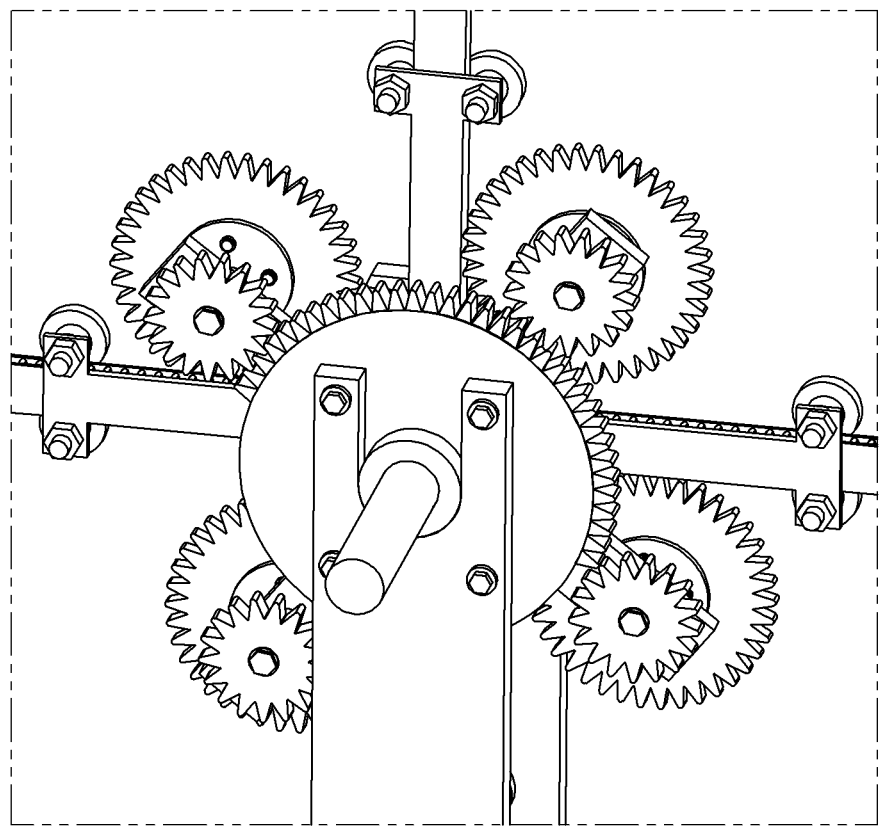
FIG. 10A is a view similar to FIG. 10 for further illustrating some components (e.g., a set of revolving gear and pinion for the second gear set 130b and 140b which are omitted in FIG. 10 for simplicity purposes are shown into assembly to provide better understanding of the present invention.

Upon further rotation of the first revolving gear 130a on the stationary half gear 120, the first end portion (now the upper end portion in FIG. 7) of the first rack shaft 150a is at an intermediately extended position ("P2") from the center of the stationary half gear 120 (which corresponds to approximately the previous location of the second revolving gear 130b shown in FIG. 7). Please refer to FIGS. 10A which illustrates this state.

Figure 11:
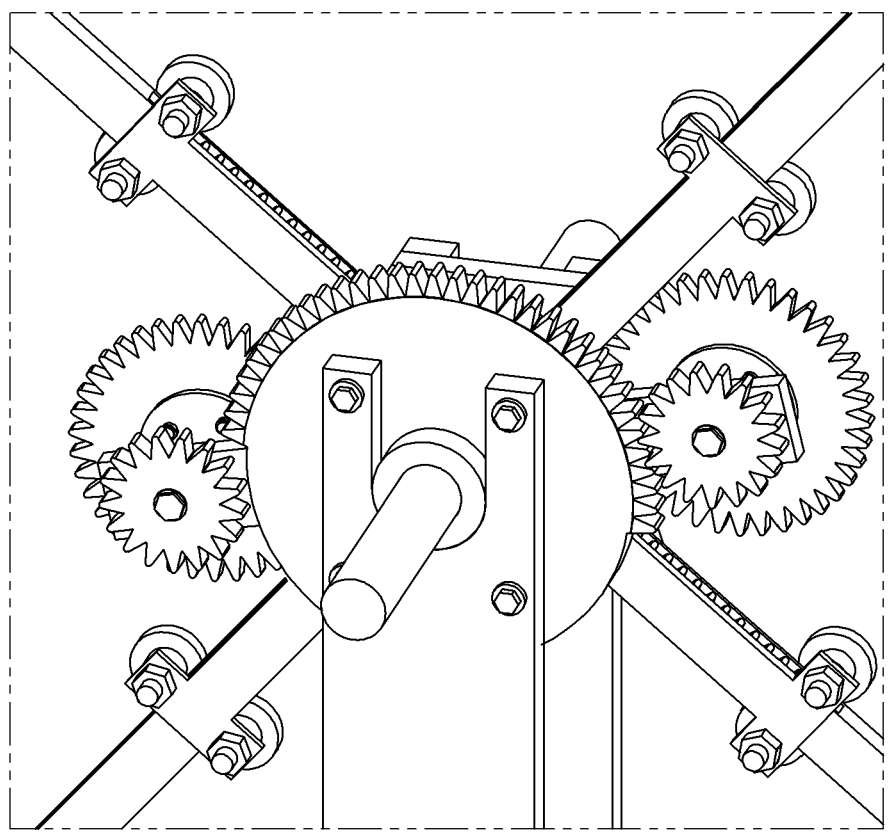
FIG. 11 is a view of an embodiment of the rotary machine for illustrating basic operation of the rotary machine, and depicting an operating state of the machine subsequent to the state shown in FIG. 10, and in this state the first end portion (now the upper right end portion) of the first rack shaft 150a is approaching to the maximally extended position (P3) at the end side of the geared portion of the stationary half gear 120.
Figure 11A:
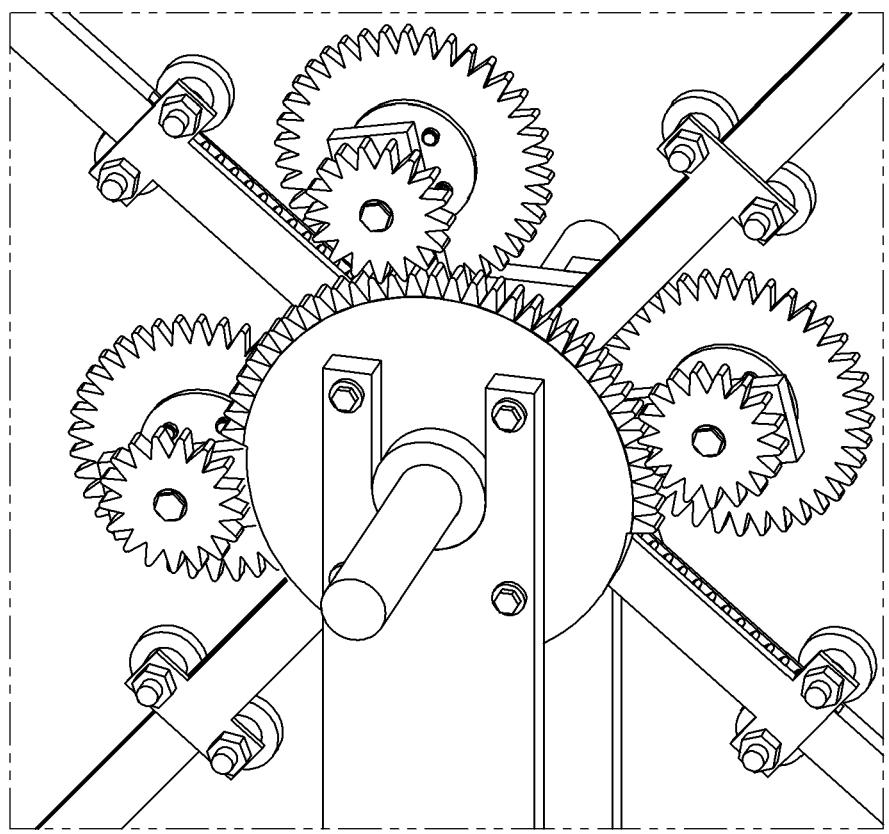
FIG. 11A is a view similar to FIG. 11, for further illustrating some components (e.g., a set of revolving gear and pinion 130b and 140b for the second rack shaft (150b)) which are omitted in FIG. 11 for simplicity purposes are shown into assembly to provide better understanding of the present invention.
Figure 11B:
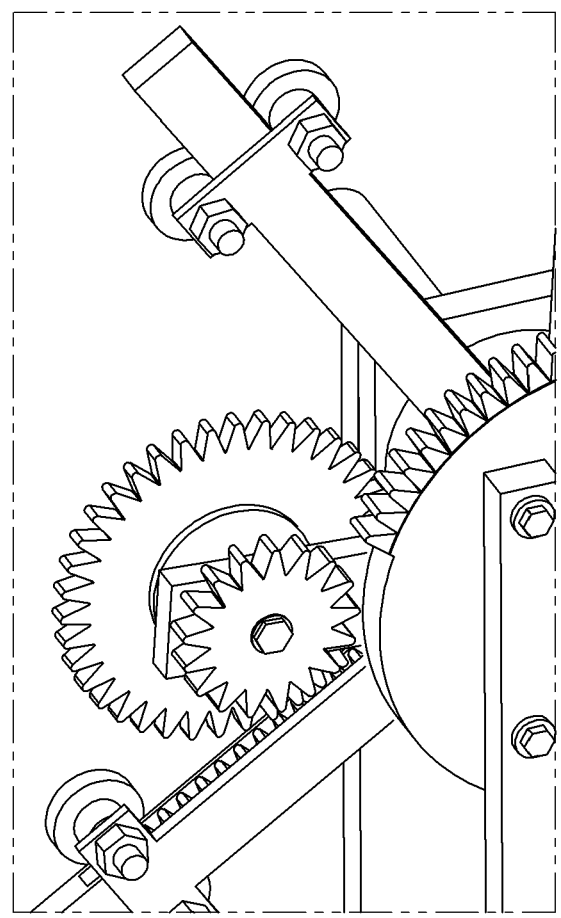

Upon further rotation from the position P2, the first end portion (now the upper right end portion in FIG. 7) of the first rack shaft 150a is now approaching to the maximally extended position ("P3") from the center of the stationary half gear 120 (which corresponds to approximately the location of the third revolving gear 130c in FIG. 7). In addition to FIG. 7, please also refer to FIGS. 11 and 11A illustrating a state immediately before this state (thus, approaching to the maximally extended position P3).

Accordingly, the center point (that is, weight center) of the first rack shaft 150a and the second rack shaft 150b become gradually extended as they progressively move from the positions P1, to P2, and to P3. Owing to the above-described design concepts of the rotary drum and the gear connection systems of the rotary machine, two active rack shaft portions of which their revolving gears and pinions are always engaged with the stationary half gear 120 and perform an upward radial extension cycle on the top half cycle (of active state) of the stationary half gear, and this make the two opposite rack shaft portions (of inactive state) to follow the upward radial extension cycle as the two rack shafts are one unitary member, respectively.

In physics and mechanics, torque ('T') can typically be calculated by the following formula:

$$T = rF \sin \theta,$$

where r is the position vector (a vector from the point about which the torque is being measured to the point where the force is applied), F is the force vector, and θ is the angle between the position and force vectors.

Therefore, in the rotary machine of the present invention, the torque increases upon rotation at the upward extension cycle as the radius 'r' to the weight center point of the rack shaft where the force (e.g., the weight vector) is applied, is gradually increased as the first and second rack shafts 150*a* and 150*b* are extended in radial direction while rotating progressively from the positions P1, to P2, and to P3. Accordingly, the rotary machine 10 of the present invention can provide enhanced torque efficiencies in its rotary motion of the rotor shafts. Thus, the rotary machine can be used for various systems involving rotary motions and energy transformation/conversion, for example, such as wind turbines or wind energy systems (to be described below in connection with another embodiment of the present invention), hydraulic power plants, various power generators, motors, and engines, etc.

As discussed above, the rotary machine of the present invention is described in connection with the machine 10 having two rotor shaft components (i.e., two rack shafts 150). However, it is noted that the present invention is not limited thereto, and the rotary machine can have different configurations. For example, the rotary machine and the power system of the invention can have three (3) or more rotors (rack shafts) spaced radially equally apart from one another, and the rotary machine or the power system can have one (1) rotor (namely, one rack shaft), for example, as shown in FIG. 15A (to be described below) showing wind turbines having one rack shaft (rack shaft 150*a*').

In addition, it is note that high strength metals, steels, metal alloys, composite engineering materials, and other suitable structural materials can be used for the mechanical components of the rotary machine such as the gears 120, 130, and 140, rack shafts 150, and roller fixing plates 160.

Referring to FIGS. 14-17 other aspects and embodiments of the present invention are described herein below.

Figure 14:
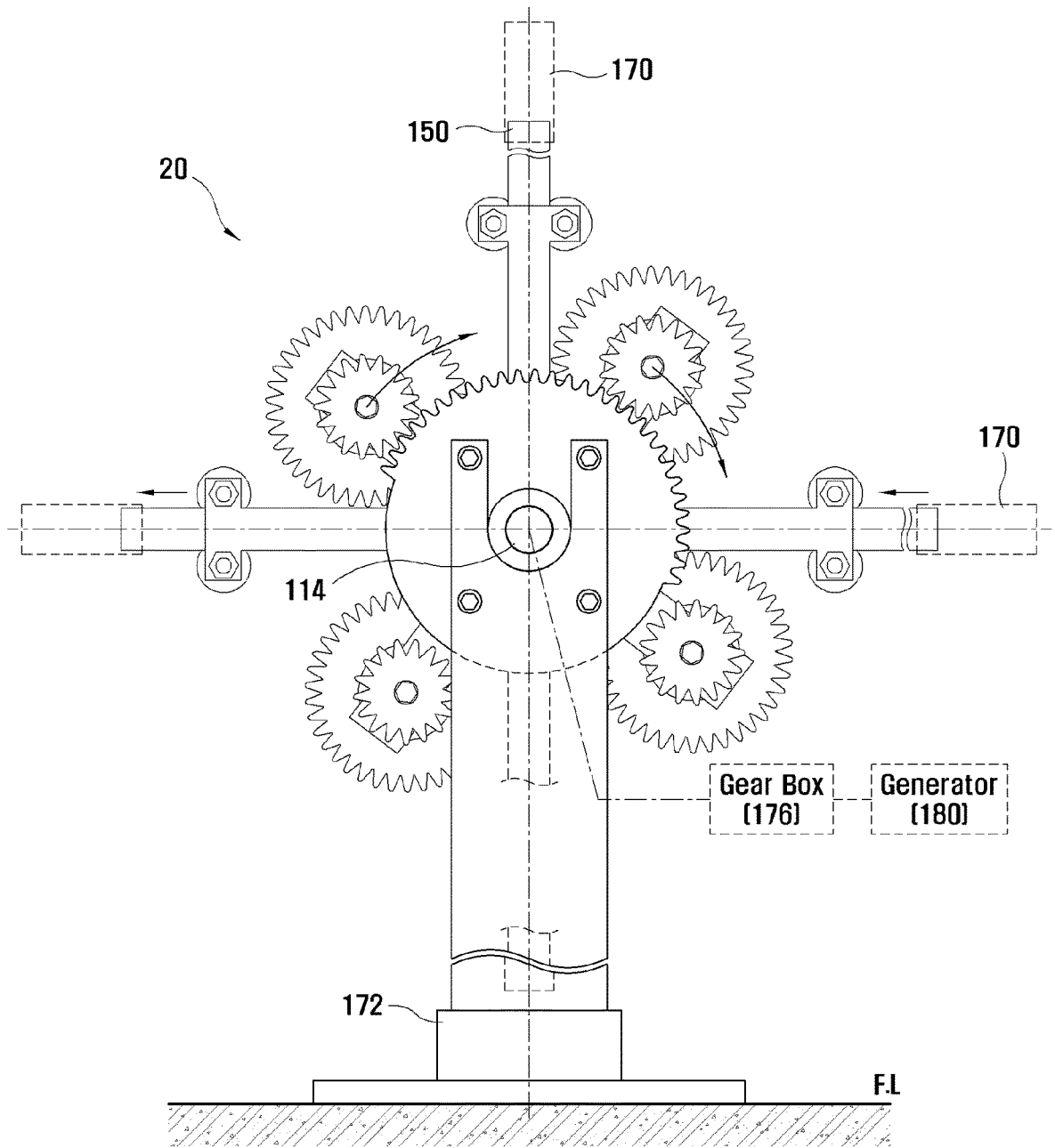
FIG. 14 is a front elevational view of the power system (or wind turbine) according to another embodiment of the present invention, utilizing the rotary machine of the invention as a main component of the power system.

FIG. 14 illustrates a power system (or power turbine) 20 utilizing the rotary machine 10 of the present invention described above.

In this embodiment, the main components of the rotary machine described above are commonly used with some modifications and additions thereto. Also, the functions and operations of the rotary machine are also basically the same as discussed above. Thus, descriptions of the same or similar features of the rotary machine 10 are not repeated herein for simplicity purposes, and to be referred above.

As such, the power system 20 comprises all the components of the rotary machine 10 discussed above. The power system 20, however, further includes rotors (blades or wings) 170 attached to a distal end side of the rack shafts 150 of the rotary machine 10 to take the wind energy in various manners known in the wind turbine industries. The blades must be designed to have a shape and structures aerodynamically optimized to help capture the maximum power from the wind in normal operation.

Figure 17:
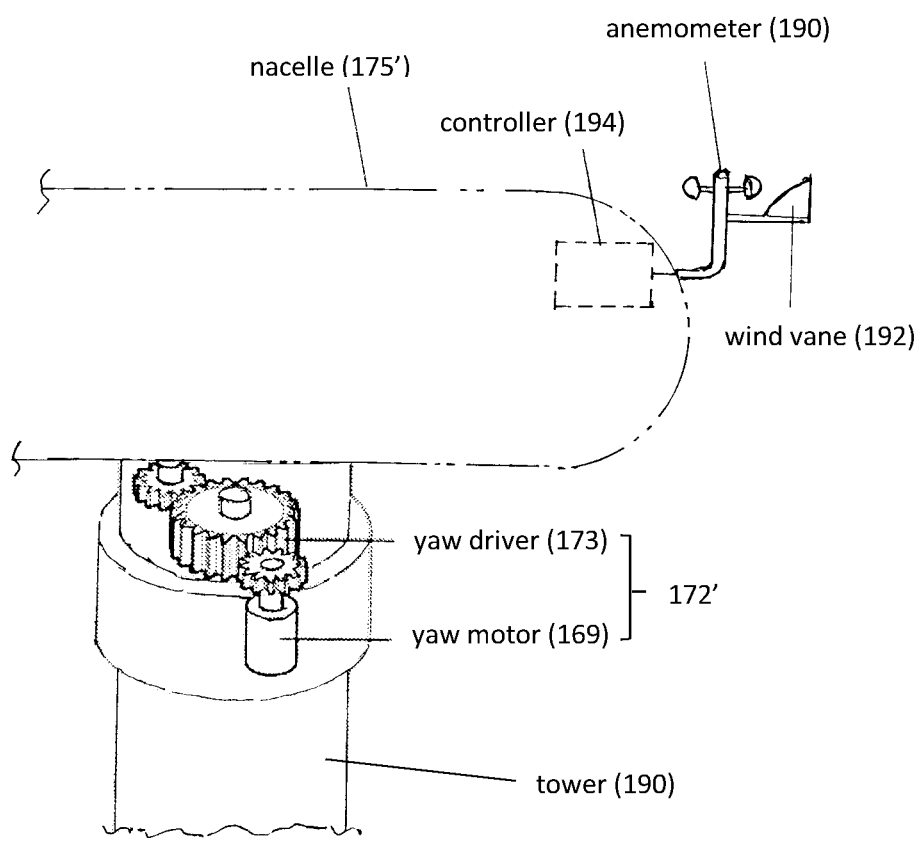

In addition, the power system 20 further includes yaw drive 172 known in the wind turbine industries, for example, see FIG. 17 illustrating basic structure of such yaw drive. Detailed structures of various yaw drives are known in the industries, and thus, omitted in this disclosure for simplicity purposes.

In addition, the power system 20 further includes a gear box 176 connected to the driving shaft 114 of the rotary machine of the present invention, and a generator 180 (known in the power system industries) is connected to the gear box 176. As discussed above, the rotary machine of the present invention can produce enhanced torque due to the torque increasing mechanism by the reciprocating rotor shafts (rack shafts 150). Thus, the rotary machine of the present invention can be used with great efficiency as the main components of the power systems.

In addition, various other components known in the power system industries can also be attached or used to the power system 20. For example, an anemometer and wind vane illustrated in FIG. 17 (see item 190 and 192—to be discussed later) can be attached to the housing or hub (not shown) of the rotary machine to measure the direction and velocity of the wind and control the facing direction of the power system 20 by yaw drive 172. Alternatively, the anemometer and the wind vane can be attached externally, preferably at a high place (such as on the roof of a residential, public or commercial building to which the power system 20 is to be installed.

FIGS. 15A and 15B illustrate the power systems according to another embodiment of the present invention, utilizing the rotary machine of the invention as a main component of the power system. In these embodiments, the rotary machine can be received within nacelle 175 with necessary modifications to adapt to use as a big or commercial turbine system. In the embodiment shown in FIG. 15A, the wind turbine system 30 has one rotor shaft used to produce power by the generator. For this, the rotary machine having one rack shaft 150*a*' is used, and the rotor/blades 170' are attached to the terminal portion of the rotating-and-reciprocating rack shaft 150*a*'. In the embodiment shown in FIG. 15B, the wind turbine system 30' has two rotor shafts used to produce power by the generator. For this, the rotary machine having two rack shafts 150*a*' and 150*b*' (the types shown in FIGS. 1-14 above) is used, and the rotor/blades 170' are attached to the terminal portion of the rotating-and-reciprocating rack shafts 150*a*' and 150*b*'.

Figure 16:
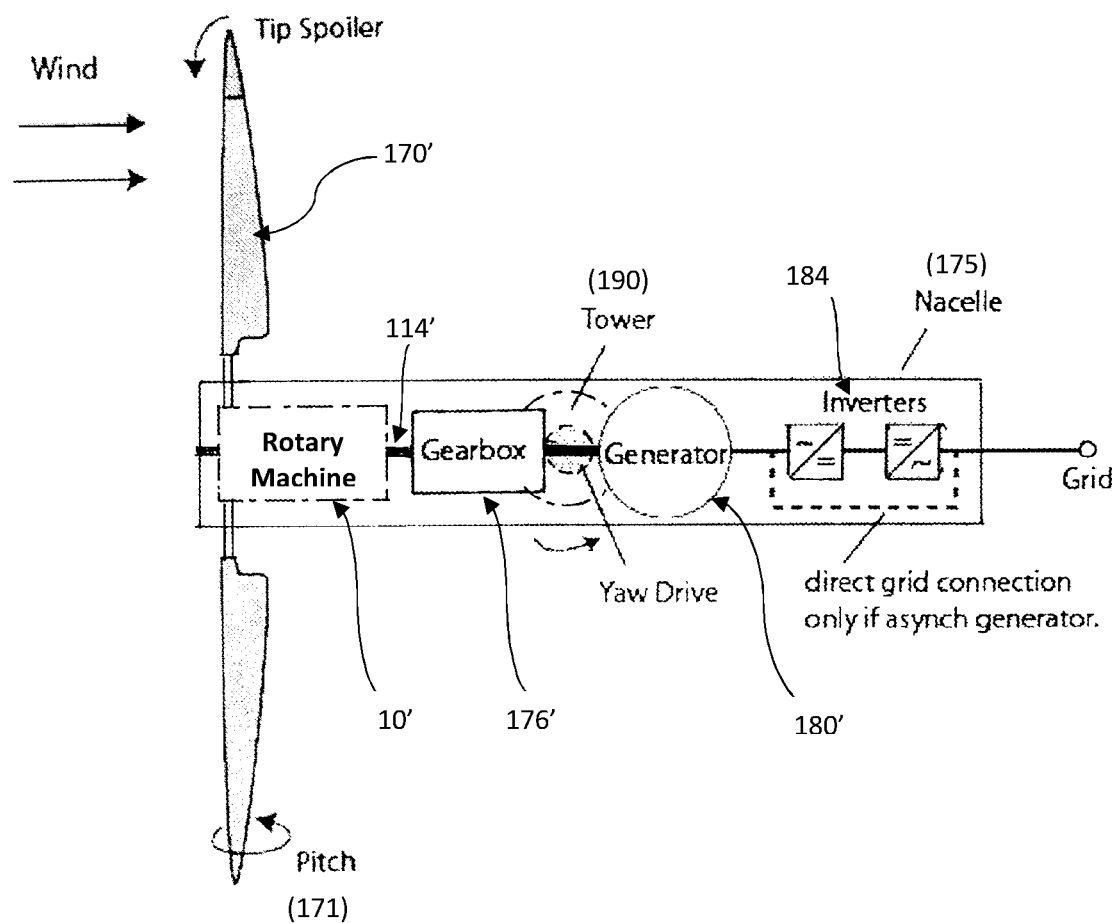
FIGS. 16 and 17 are schematic drawings illustrating preferred components of the power system, that are typically to be contained in the nacelle of the system.

FIGS. 16 and 17 are schematic drawings illustrating preferred components of the power system, that are typically to be contained in the nacelle or the system.

Referring to FIG. 16, the gear box 176' is used to increase or decrease the rotational speed of the rotor shaft to control the rotational speed of the generator. The yaw drive 172' typically includes a yaw motor 169 and yaw drive components (e.g., gears 173), and rotates the turbine or nacelle 175 to face the wind. The tower 190 supports the rotor systems, nacelle, blades, and other wind turbine equipment. The generator 180' converts the mechanical energy (wind energy) from the rotor to electrical energy. Inverters 184 are used to transform the generator's output frequency to the grid-required frequency. The nacelle 175 or 175' is the enclosure of the wind turbine generator, gearbox, and internal equipment, and used to protect such components. Pitch 171 is the mechanism of adjusting the angle of attack of the rotor blades. Blades are turned in their longitudinal axis to change the angle of attack according to the wind directions.

Referring to FIG. 17, the anemometer 190 is a type of sensor that is used to measure the wind speed. The wind speed information may be necessary for maximum power tracking and protection in emergency cases, and the wind vane 192 is a sensor used to measure the wind direction. The controller 194 is used for controlling the yaw system 172' to face the wind using the wind direction information from the anemometer 190 and the wind vane 192.

As detailed above, the rotary machine of the present invention can be used for various systems involving rotary motions and energy transformation/conversion, for example, such as wind turbines or wind energy systems, hydraulic power plants, various power generators, motors, and engines, etc., with greater power efficiency.

Although the currently preferred embodiments of the present invention have been disclosed for illustrative purposes, those skilled in the art will appreciate that various modifications, additions and substitutions are possible, without departing from the scope and spirit of the invention as will be understood by those skilled in the art upon examining the full disclosure in association with the drawings provided.

What is claimed is:

1. A rotary machine comprising:
a frame or housing;
a rotary drum having a center shaft configured to be rotated relative to the frame or housing, the rotary drum including a body portion and at least one pair of gear positioning arms extended radially outwardly from the rotary drum;
a stationary half gear arranged on the center shaft and including a non-geared portion of generally a circular contour and a geared portion having gear teeth, an outer diameter of the gear teeth raised from the non-geared portion;
at least one pair of revolving gears, each pair composed of two revolving gears symmetrically positioned about the center shaft of the rotary drum and configured to simultaneously revolve around the stationary half gear, wherein the revolving gears are coupled to corresponding gear positioning arms, respectively,
at least one pair of pinions coaxially coupled with the at least one pair of gear positioning arms, respectively; and
at least one rack shaft operably coupled to the pinions to provide a relative movement between the rack shaft and the pinions,
wherein as the revolving gears revolve around the stationary half gear, one of the two revolving gears is configured to have gear engagement with the geared portion of the stationary half gear, while the other revolving gear is configured to be idle to float over the non-geared portion of the stationary half gear.

2. The rotary machine according to claim 1, wherein the relative movement between the rack shaft and the pinions is either a reciprocating movement of the rack shaft upon rotation of the pinions, or a rotational movement of the pinions, and their associated revolving gears and rotary drum, upon reciprocating movement of the rack shaft.

3. The rotary machine according to claim 2, wherein the at least one rack shaft includes linearly arranged gear teeth and are operably coupled with the pinions.

4. The rotary machine according to claim 2, further comprising at least one roller fixing plate, the roller fixing plate including a plurality of rollers for guiding reciprocal movements of the rack shaft.

5. The rotary machine according to claim 4, wherein the body portion of the rotary drum includes at least one guide slot diametrically formed there-through, and the rack shaft and the roller fixing plate are coupled to the guide slot.

6. The rotary machine according to claim 2, wherein the rotary machine has two pairs of revolving gears and two pairs of pinions, wherein the revolving gears and the pinions are positioned 90 degrees apart to one another, respectively.

7. The rotary machine according to claim 2, wherein the frame or housing includes two post bodies spaced apart to each other, the post bodies having at least one bearing for receiving the center shaft of the rotary machine thereto, and wherein the stationary half gear and the rotary drum are arranged between the two post bodies.

8. A power system comprising:
a rotary machine, wherein the rotary machine comprises:
a frame or housing;
a rotary drum having a center shaft configured to be rotated relative to the frame or housing, the rotary drum including a body portion and at least one pair of gear positioning arms extended radially outwardly from the rotary drum;
a stationary half gear arranged on the center shaft and including a non-geared portion of generally a circular contour and a geared portion having gear teeth, an outer diameter of the gear teeth raised from the non-geared portion;
at least one pair of revolving gears, each pair composed of two revolving gears symmetrically positioned about the center shaft of the rotary drum and configured to simultaneously revolve around the stationary half gear, wherein the revolving gears are coupled to corresponding gear positioning arms, respectively,
at least one pair of pinions coaxially coupled with the at least one pair of gear positioning arms, respectively; and
at least one rack shaft operably coupled to the pinions to provide a relative movement between the rack shaft and the pinions,
wherein as the revolving gears revolve around the stationary half gear, one of the two revolving gears is configured to have gear engagement with the geared portion of the stationary half gear, while the other revolving gear is configured to be idle to float over the non-geared portion of the stationary half gear; and
wherein the power system further comprises:
at least two blades, each blade coupled to each terminal end portion of the rack shafts.

9. The power system according to claim 8, further comprising a yaw drive configured to control the orientation of the rotary machine, a gear box couples to the center shaft of the rotary machine, and a generator to convert the wind energy from the center shaft of the rotary machine to electrical energy.

10. The power system according to claim 9, further comprising an anemometer to measure the wind speed, and a wind vane to measure the wind direction.

11. The power system according to claim 8, wherein the relative movement between the rack shaft and the pinions is a rotational movement of the pinions, and their associated revolving gears and rotary drum, upon reciprocating movement of the rack shaft.

12. The power system according to claim 11, wherein the body portion of the rotary drum includes at least one guide slot diametrically formed there-through, and the rack shaft and the roller fixing plate are coupled to the guide slot.

13. The power system according to claim 8, wherein the at least one rack shaft includes linearly arranged gear teeth and are operably coupled with the pinions.

14. The power system according to claim 8, wherein the rotary machine has one pair of revolving gear and one pair of pinions, wherein the revolving gears and the pinions are positioned 180 degrees apart to each other.

15. The power system according to claim 8, wherein the rotary machine has two pairs of revolving gears and two pairs of pinions, wherein the revolving gears and the pinions are positioned 90 degrees apart to one another, respectively.

* * * * *